US011654824B1

(12) United States Patent
Dudar (10) Patent No.: US 11,654,824 B1
(45) Date of Patent: May 23, 2023

(54) EXTERNAL DISPLAY OF VEHICLE LOAD INFORMATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/820,751

(22) Filed: Aug. 18, 2022

(51) Int. Cl.
| | |
|---|---|
| *B60Q 1/50* | (2006.01) |
| *B60K 35/00* | (2006.01) |
| *B60Q 1/00* | (2006.01) |
| *G06F 3/14* | (2006.01) |
| *G01G 19/08* | (2006.01) |

(Continued)

(52) U.S. Cl.
CPC .............. *B60Q 1/543* (2022.05); *B60K 35/00* (2013.01); *B60Q 1/0076* (2013.01); *B60R 1/1207* (2013.01); *G01G 19/08* (2013.01); *G01G 23/32* (2013.01); *G02B 27/0101* (2013.01); *G06F 3/14* (2013.01); *B60K 2370/1529* (2019.05); *B60Q 2400/50* (2013.01); *G02B 2027/014* (2013.01); *G02B 2027/0141* (2013.01)

(58) Field of Classification Search
CPC .. B60Q 1/543; B60Q 1/0076; B60Q 2400/50; B60K 35/00; B60K 2370/1529; B60R 1/1207; G01G 19/08; G01G 23/32; G02B 27/0101; G02B 2027/014; G02B 2027/0141; G06F 3/14
See application file for complete search history.

(56) References Cited

U.S. PATENT DOCUMENTS

| | | | |
|---|---|---|---|
| 6,006,159 | A | 12/1999 | Schmier et al. |
| 10,933,824 | B2 | 3/2021 | Niedert et al. |

(Continued)

FOREIGN PATENT DOCUMENTS

| | | |
|---|---|---|
| JP | 4583157 B2 | 11/2010 |
| KR | 102208660 B1 | 1/2021 |

OTHER PUBLICATIONS

Commercial Vehicle Solutions, Intelligent Trailer Program Load Optimization, ZF Friedrichshafen AG, 1-10.

(Continued)

*Primary Examiner* — Brent D Castiaux
(74) *Attorney, Agent, or Firm* — Brandon Hicks; Eversheds Sutherland (US) LLP (57) ABSTRACT

The disclosure is generally directed to systems and methods for providing a display pertaining to a vehicle payload. An example method executed by a processor of a vehicle payload display system includes determining a weight of a payload placed upon the vehicle and displaying upon a ground surface outside the vehicle and/or upon a windshield of the vehicle, an image that provides an indication of the weight of the payload placed upon the vehicle. Another example method executed by the processor includes obtaining information about a laden weight of the vehicle, determining a weight difference between the laden weight and a payload capacity of the vehicle, determining, based on the weight difference, a payload margin available for loading the vehicle or an excess weight loaded upon the vehicle, and displaying the payload margin or the first excess weight upon a display surface that is viewable from outside the vehicle.

12 Claims, 4 Drawing Sheets

(51) Int. Cl.
*G02B 27/01* (2006.01)
*B60R 1/12* (2006.01)
*G01G 23/32* (2006.01)

(56) References Cited

U.S. PATENT DOCUMENTS

| | | | |
|---|---|---|---|
| 2007/0247447 A1* | 10/2007 | Mack | G06Q 30/02 |
| | | | 345/204 |
| 2020/0207294 A1* | 7/2020 | Niedert | B60R 16/0232 |
| 2020/0377004 A1* | 12/2020 | Zhang | G09F 19/18 |
| 2021/0268991 A1* | 9/2021 | De Wind | B60Q 1/323 |
| 2022/0176959 A1* | 6/2022 | Katsuki | B60W 40/13 |

OTHER PUBLICATIONS

Ford, F-150 Adds Class-Exclusive Tech With Onboard Scales to Simplify Loading and Trailering, Active Suspension for Greater Confidence, Apr. 28, 2021.

Yanling Liu, et al., An Optimized Method for Dynamic Measurement of Truck Loading Capacity, IEEE, Oct. 18, 2018, 120-124.

* cited by examiner

EXTERNAL DISPLAY OF VEHICLE LOAD INFORMATION

BACKGROUND

Vehicle loading can affect breaking distance and vehicle wear-and-tear. For example, a heavily loaded vehicle may require a greater braking effort and a longer stopping distance than a vehicle carrying a lighter load. A heavily loaded vehicle may also lead to more wear-and-tear of vehicle components. It is therefore desirable to provide solutions that address vehicle loading.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, embodiments described in this disclosure are generally directed to systems and methods for providing a display pertaining to a vehicle payload. An example method executed by a processor of a vehicle payload display system may include determining a weight of a payload placed upon the vehicle and displaying upon a ground surface outside the vehicle and/or upon a windshield of the vehicle, an image that provides an indication of the weight of the payload placed upon the vehicle. Another example method executed by the processor may include obtaining information about a laden weight of the vehicle, determining a weight difference between the laden weight and a payload capacity of the vehicle, determining, based on the weight difference, either a payload margin available for loading the vehicle or an excess weight loaded upon the vehicle, and displaying the payload margin or the first excess weight upon a display surface that is viewable from outside the vehicle. In an example implementation, a projector that is located in a door or a side view mirror of the vehicle may be used to project the image upon the ground surface. A heads-up display system may be used to display the image upon the windshield of the vehicle. The heads-up display is configured to be viewable from outside the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "information" as used herein pertains to any of various forms of data that can be processed by a processor (digital data, digital images, detector signals, etc.). The word "detector" as used herein refers to any device than may be used to obtain information about an object (particularly weight information), to detect the presence of an object, and/or to detect actions performed by individuals. The word "object" and the word "item" are used in this disclosure in an interchangeable manner. The word "vehicle" as used in this disclosure can pertain to any one of various types of vehicles such as cars, vans, sports utility vehicles, trucks, electric vehicles, gasoline vehicles, and hybrid vehicles. The word "payload" as used in this disclosure generally refers to any of various types of objects that can be loaded on to a vehicle such as, for example, an item that is placed on a cargo bed of a truck, an item placed on a luggage rack of a vehicle, an item placed in the trunk of a vehicle, or an item placed in a cabin area of a vehicle. The introduction of a payload on to a vehicle typically causes a change in weight imposed upon the chassis of the vehicle. The changed weight of the vehicle is referred to herein as a "laden" weight of the vehicle. An "unladen" vehicle as used herein refers to a vehicle having an intrinsic weight prior to the introduction of any item into, or upon, the vehicle. It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
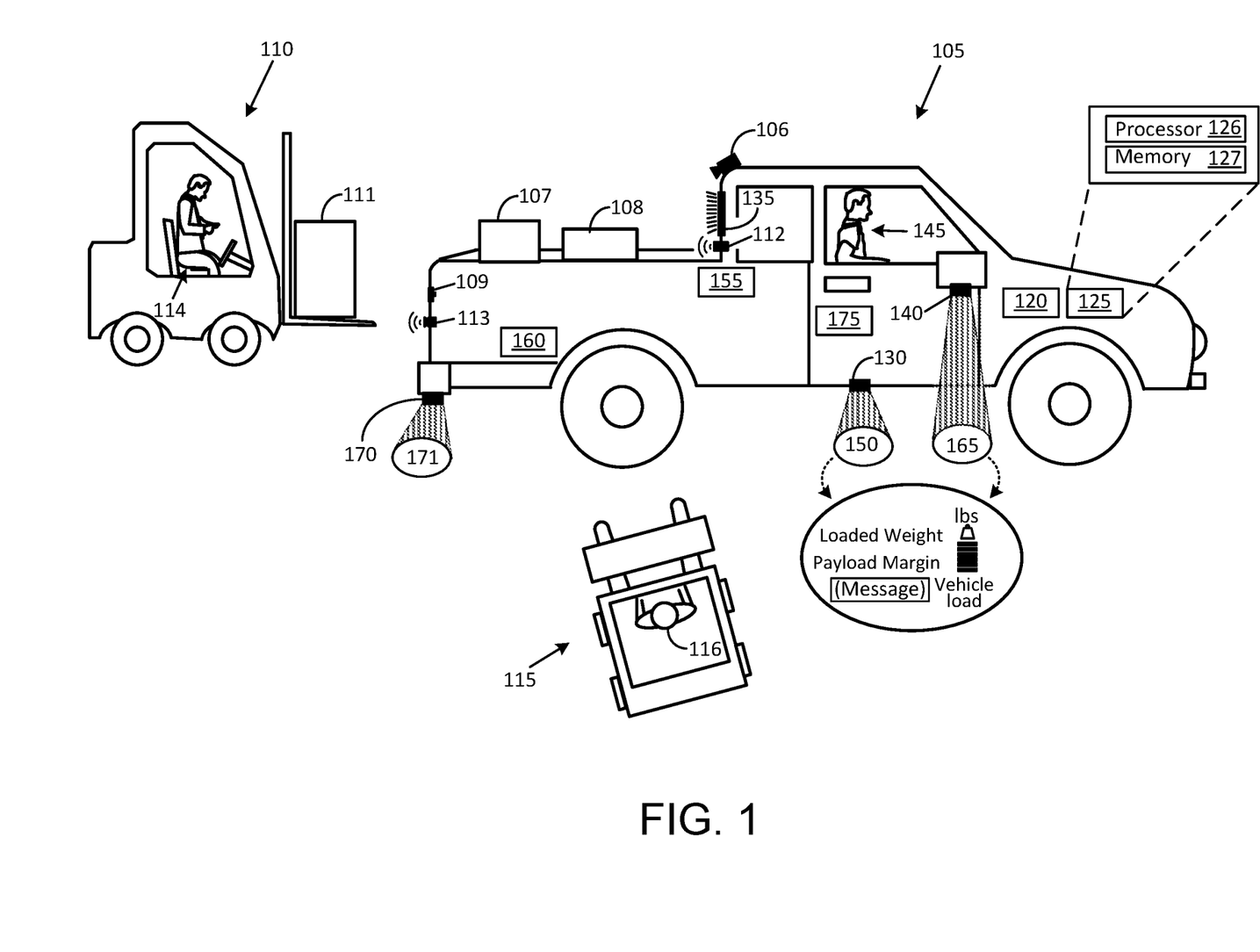
FIG. 1 shows an example vehicle that includes a vehicle payload display system in accordance with an embodiment of the disclosure.

FIG. 1 shows a vehicle 105 that includes a vehicle payload display system 125 in accordance with an embodiment of the disclosure. The vehicle 105 may further include components such as, for example, a vehicle computer 120, a weight sensor 160, an image projector 130, an image projector 140, an image projector 170, a heads-up display (HUD) system 155, a switch 109, a beeper 113, an object detector 112, and a camera 106. These components may be communicatively coupled to the vehicle payload display system 125 via a wired communication medium and/or a wireless communication medium.

In the illustrated example, the vehicle 105 is a truck containing a cargo bed on which items can be placed, and the description herein pertains to various systems and methods of operation in accordance with the disclosure that may be associated with the truck. However, it must be understood that the systems and methods of operation described herein are equally applicable to various other types of vehicles (sedan, van, sports utility vehicle, forklift, etc.). Thus, for example, a description pertaining to a payload operation involving the placing of objects upon the cargo bed of the truck (illustrated in FIG. 1) is equally applicable to a payload operation involving the placing of objects inside the trunk of a sedan, for example. As another example, a description pertaining to projecting a display upon a ground surface below a door of the truck is equally applicable to projecting a display upon a ground surface below a door of a sedan or a van, for example.

The vehicle computer 120 may perform various functions of the vehicle 105, such as, for example, controlling engine operations (fuel injection, speed control, emissions control, braking, etc.), managing climate controls (air conditioning, heating etc.), activating airbags, and issuing warnings (check engine light, bulb failure, low tire pressure, etc.). The vehicle computer 120 may also provide various types of information to the vehicle payload display system 125, such as, for example, information pertaining to one or more actions performed by a driver 145 that may change a laden weight of the vehicle 105.

Any one or more of the image projector 130, the image projector 140, the image projector 170, and the HUD system 155, can be placed in an active state by the vehicle payload display system 125 at any of various times and in various ways. In an example implementation, the vehicle payload display system 125 is configured to place any one or more of such devices in an active state each time an ignition key of the vehicle 105 is used (either for turning on the engine or for turning on a component of the vehicle 105 such as, for example, an infotainment system).

In another example implementation, the vehicle payload display system 125 is configured to automatically place any one or more of the image projector 130, the image projector 140, the image projector 170, and the HUD system 155 in an active state for projecting an image whenever a door of the vehicle 105 is opened (irrespective of the ignition key being inserted into the ignition lock).

In yet another example implementation, the vehicle payload display system 125 is configured to place any one or more of the image projector 130, the image projector 140, the image projector 170, and the HUD system 155 in an active state for projecting an image in response to activation of a switch 109 provided in the vehicle 105 (in this case, mounted in a tail gate of the vehicle 105).

In an example operation, the switch 109, which can be a push-button switch or a toggle switch, is activated a predetermined number of times (one time, two times, three times, etc.) to place the vehicle payload display system 125 in an active state, and/or to trigger the vehicle payload display system 125 to project one or more images.

In some cases, the switch 109 can be a multi-position switch that is operable to trigger the vehicle payload display system 125 to execute one or more of various types of actions. The various actions can involve, for example, selectively turning on a single device (the image projector 130, for example), turning on more than one device (the image projector 130 and the HUD system 155, for example), or turning on all devices (the image projector 130, the image projector 140, the image projector 170, and the HUD system 155).

The image projector 130 may be any of various types of image projection devices (such as, for example, a video projector, a slide projector, or a digital image projector) and can be mounted upon any of various parts of the vehicle 105. In an example implementation in accordance with the disclosure, the image projector 130 can be provided inside a door panel assembly of the vehicle 105 or on a bottom portion of a door of the vehicle 105. In the illustrated example, the image projector 130 is mounted on a bottom surface of a passenger-side door and is arranged to project an image 150 (or a video clip) upon a ground surface outside the vehicle 105 (in this case, upon a ground surface outside the passenger-side door of the vehicle 105).

The image can be projected upon the ground surface at various instants in time and may be triggered by various events. In an example implementation, the image 150 is projected upon the ground surface whenever the passenger-side door is opened. The image 150 is an example image that provides information pertaining to a payload of the vehicle 105 in accordance with the disclosure.

The image projector 140 may be substantial similar, or identical, to the image projector 130 and may be provided on the vehicle 105 in addition to or in lieu of, the image projector 130 in various implementations in accordance with the disclosure. In the illustrated example, the image projector 140 is mounted on a bottom surface of a passenger-side side mirror and is arranged to project an image 165 (and/or a video clip) upon a ground surface outside the vehicle 105 (in this example scenario, upon a ground surface outside the passenger-side door of the vehicle 105). The image 165 may provide information that is identical to, similar to, complements, or supplements, information provided by the image 150. The image projector 140 can be placed in an active state in a manner similar to the manner described above with reference to the image projector 130.

The image projector 170 may be substantial similar, or identical, to the image projector 130 and may be provided on the vehicle 105 in addition to or in lieu of, the image projector 130 and/or the image projector 140 in various implementations. In the illustrated example, the image projector 170 is mounted on a bottom surface of a rear bumper of the vehicle 105 and is arranged to project an image 171 (and/or a video clip) upon a ground surface outside the vehicle 105 (in this example case, upon a ground surface below and/or partially behind the rear bumper. The image 171 may provide information that is identical to, similar to, complements, or supplements, information provided via the image 150 and/or the image 165.

In an example implementation, the image projector 170 can be placed in an active state by default each time an ignition key of the vehicle 105 is used either for turning on the engine or turning on some components of the vehicle 105 (infotainment system, lights, for example). In another example implementation, the image projector 170 can be automatically placed in an active state whenever the tail gate of the vehicle 105 is opened such as, for loading an item on to the cargo bed of the vehicle 105. In yet another example implementation, the image projector 170 can be placed in an active state by activating the switch 109 provided in the vehicle 105.

The HUD system 155 is configured to display a heads-up image 135 upon a windshield of the vehicle 105. The heads-up image 135 is arranged to be viewable (and readable) from outside the vehicle 105, such as, from behind the vehicle 105 or from either side of the vehicle 105. In the illustrated example vehicle 105, the heads-up image is displayed upon a rear windshield of the vehicle 105. The heads-up image 135 may provide information that is identical to, similar to, complements, or supplements, information provided via the image 150, the image 165, and/or the image 171. In some cases, the heads-up image 135 may be viewed by individuals such as, for example, a forklift operator 114 operating the forklift 110 to obtain weight information pertaining to the vehicle 105. In some cases, the heads-up image 135 may be viewed by a driver of another vehicle as the vehicle 105 is moving on a road. The driver of the other vehicle may recognize that the vehicle 105 is loaded and may have limitations in terms of speed and acceleration.

The object detector 112 can be may any of various devices such as, for example, a radar detector, a sonar detector, a light detection and ranging (LIDAR) detector and/or a motion detector. The object detector 112 may be arranged to detect placement of an object on the vehicle 105 such as, for example, placement of a package 107 on the cargo bed of the vehicle 105 and/or to detect removal of an object from the cargo bed of the vehicle 105 such as, for example, a removal of a package 108 from the cargo bed of the vehicle 105.

The camera 106, which can be, for example, a video camera, may be arranged to detect various types of activities outside the vehicle 105. In an example situation, the camera 106 is arranged to capture an image or a video clip of the forklift operator 114 operating the forklift 110 and to convey the image to the vehicle payload display system 125. The vehicle payload display system 125 may evaluate the image to detect placement of an object on the vehicle 105 such as, for example, placement of a package 111 on the cargo bed of the vehicle 105 and/or to detect removal of a package from the cargo bed of the vehicle 105, such as, for example, a removal of the package 108 from the cargo bed of the vehicle 105.

The weight sensor 160 may be arranged to detect weight parameters of the vehicle 105 under various conditions. In a first example condition, the vehicle 105 is unoccupied, and contains no cargo items (cargo, luggage, packages, etc.). In this first condition, the weight sensor 160 detects an unladen weight of the vehicle 105. The unladen weight may also be referred to as a tare weight.

In a second example condition, the vehicle 105 is unoccupied and contains one or more cargo items, such as, for example, a package in a cargo area of a delivery vehicle (when the vehicle 105 is a truck or a delivery van) or a suitcase in a trunk of a sedan (when the vehicle 105 is a sedan). In this second condition, the weight sensor 160 detects a first laden weight of the vehicle 105.

In a third example condition, the vehicle 105 contains one or more occupants such as the driver 145 and a passenger (if present) and also contains one or more cargo items. In this third condition, the weight sensor 160 detects a second laden weight of the vehicle 105. The second laden weight corresponds to a weight of the occupants added to either the tare weight (when the vehicle 105 is unoccupied and contains no cargo items) or the first laden weight (when the vehicle 105 is unoccupied and contains cargo items).

In an example implementation in accordance with the disclosure, a weight parameter detected by the weight sensor 160, such as, for example, the tare weight, the first laden weight, and/or the second laden weight, is conveyed to the vehicle payload display system 125 for executing one or more operations in accordance with the disclosure.

An example operation can involve the vehicle payload display system 125 evaluating the weight parameter and using one or more of the image projector 130, the image projector 140, the image projector 170, and the HUD system 155 to project an image in the manner described above. The image may, for example, provide a warning to the driver 145 about a weight issue. Another example operation can involve the vehicle payload display system 125 evaluating the weight parameter and issuing a warning about the weight issue in the form of an audible alert via the beeper 113.

In another example implementation in accordance with the disclosure, a weight parameter is provided to the vehicle payload display system 125 by a system or device other than the weight sensor 160. In an example scenario, the weight parameter (a laden weight, for example) is provided to the vehicle payload display system 125 by a vehicle weighing apparatus embedded in the ground (such as, for example, in a weighing station located beside an interstate highway for weighing commercial delivery trucks).

In this implementation, the vehicle payload display system 125 may evaluate the weight parameter (the laden weight) provided by the vehicle weighing apparatus and use the image projector 130, the image projector 140, the image projector 170, and/or the HUD system 155 to project an image containing information pertaining to the weight parameter and/or information pertaining to various operations executed in accordance with the disclosure. In an example scenario, the image may provide information about a payload margin available for loading the vehicle 105.

The vehicle payload display system 125 may also receive input from various other devices such as, for example, in the form of one or more images captured by the camera 106. The image(s) provided by the camera 106 to the vehicle payload display system 125 can include for example, a digital image, a video clip, or a live video feed. In an example configuration, the image(s) may be evaluated by the vehicle payload display system 125 in order to identify various objects that are located in the vehicle 105, to identify objects that an individual (such as, for example, the forklift operator 114) is placing on/in the vehicle 105, and/or to identify objects that the individual may be removing from the vehicle 105.

An object being placed on the vehicle 105 by the individual (or removed from the vehicle 105) can be, for example, an item being placed upon a cargo bed of the vehicle 105 (when the vehicle 105 is a truck or van, for example), a suitcase being loaded into a trunk of the vehicle 105 (when the vehicle 105 is a sedan, for example), a package being placed upon a cargo rack on the roof of the vehicle 105 (when the vehicle 105 is a sedan, for example), or an object that is being relocated inside a cabin area of the vehicle 105.

The vehicle payload display system 125 may not only evaluate images to detect objects being placed, relocated, or removed from the vehicle 105, but may also evaluate images to obtain information about objects that are being removed, or have been removed, from the vehicle 105. For example, in one scenario, the vehicle payload display system 125 may evaluate differences between a first image and a second image provided by the camera 106 and detect an object that is being removed, or has been removed, from the trunk, the cargo bed, or the cargo rack, of the vehicle 105.

In addition to, or in lieu of, images received from the camera 106, the vehicle payload display system 125 may receive a signal from the object detector 112 that provides an indication that an object is being placed, relocated, or removed from the vehicle 105.

The various examples provided above with respect to addition or removal of objects from the vehicle 105, results in weight changes, such as weight changes to the unladen weight, the first laden weight, or the second laden weight of the vehicle 105. The vehicle payload display system 125 may obtain information about such weight changes by evaluating signals and/or images received from one or more of the detectors described above. The information about weight changes may be used by the vehicle payload display system 125 to project one or more images by use of the image projector 130, the image projector 140, the image projector 170, and/or the HUD system 155. The projected image(s) may provide information pertaining to the weight parameter and/or information pertaining to various operations executed in accordance with the disclosure.

More particularly, in an example scenario, a processor 126 of the vehicle payload display system 125 is configured to access a memory 127 and execute computer-executable instructions stored in the memory 127 to perform various operations. The operations can include obtaining, from the weight sensor 160, weight information of the vehicle 105. The weight information may be evaluated to obtain information about a first laden weight of the vehicle 105. The processor 126 may evaluate one or more images obtained from the camera 106 in order to obtain information about objects that contribute to the first laden weight.

The processor 126 may then detect introduction of an object into the vehicle 105 such as, for example, an object being placed on the cargo bed of the vehicle 105, or a passenger entering the vehicle 105. The detection may be made by obtaining information from the weight sensor 160 and/or by evaluating one or more images obtained from the camera 106.

Upon detecting the introduction of an object into the vehicle 105, the processor 126 may obtain, and evaluate weight information received from the weight sensor 160. The evaluation can include identifying a change in the first laden weight to a second laden weight due to introduction of the object into the vehicle. The processor 126 may then determine that the second laden weight exceeds a payload capacity of the vehicle. The payload capacity of the vehicle 105 may be obtained, for example, from a database of the vehicle payload display system 125, a database of a computer located outside the vehicle 105, or from cloud storage. Obtaining payload capacity information from the database of the computer located outside the vehicle 105 or from cloud storage, may be carried out by use of wireless communications via a wireless communication system (not shown) provided in the vehicle 105.

If the processor 126 determines that the second laden weight exceeds the payload capacity of the vehicle 105, an "overweight" advisory may be issued in order to warn the driver 145 of an overweight condition of the vehicle 105. The advisory may be issued in the form of information displayed on one or more images projected by the image projector 130, the image projector 140, the image projector 170, and/or the HUD system 155.

The information can include, for example, the payload capacity of the vehicle 105, the payload margin that was available for loading the vehicle 105 prior to introduction of the object into the vehicle 105, and/or excess weight information (a difference between the second laden weight and the payload capacity of the vehicle 105). In one implementation, the payload margin may be identified by determining a weight difference between a laden weight of the vehicle 105 and a payload capacity of the vehicle 105. In another implementation, the payload margin may be identified by determining a weight difference between a laden weight of the vehicle 105 and a threshold weight limit.

In one case, the threshold weight limit is equal to the payload capacity of the vehicle 105. In another case, the threshold weight limit is equal to a weight value that is lower than the payload capacity of the vehicle 105. The weight value can be defined, for example, as a percentage with respect to the payload capacity (for example, 90% of the payload capacity, 10% below the payload capacity, 20 lbs. below the payload capacity, etc.).

The processor 126 may further provide guidance on how to reduce the second laden weight below a threshold weight limit. The guidance provided by the processor 126 can include a suggestion to remove an object from the vehicle 105. The processor 126 may identify the object to be removed from the vehicle 105, by referring to an inventory of objects stored in a database of the vehicle payload display system 125 (or stored in a device such as a computer located outside the vehicle 105 or a cloud storage device). In an example scenario, the advisory to reduce the second laden weight may include recommending refraining from filling a fuel tank of the vehicle 105 beyond a first threshold level or reducing an amount of fuel contained in the fuel tank of the vehicle 105.

The inventory may be created by executing an inventorying procedure at various instants in time. In an example implementation, the inventorying procedure may be executed each time the vehicle 105 is started. The inventorying procedure may include the processor 126 evaluating images of various objects located inside and/or outside the vehicle 105. The images can be provided by various cameras such as the ones described above. A weight of each of the objects may be obtained from the weight sensor 160 and included in the inventory. The various objects that are identified and stored in the inventory can include one or more individuals who enter the vehicle 105 such as, for example, the driver 145 and a passenger.

The processor 126 may evaluate the weights of various objects (including occupants of the vehicle 105) to identify one or more objects that may be suitable for removal from the vehicle 105. The evaluation can include comparing a weight of an object to a payload margin available for loading the vehicle 105. In some cases, it may be necessary to remove more than a single object from the vehicle 105 in order to reduce the second laden weight below the threshold weight limit.

The object to be removed can either be the object that triggered the overweight advisory or a second object. The second object can be either an object that was placed in the vehicle 105 by an individual or can be an accessory. Some examples of the second object placed in the vehicle 105 can include an item on a cargo bed of the vehicle 105 (when the vehicle 105 is a truck or van, for example), a suitcase in a trunk of the vehicle 105 (when the vehicle 105 is a sedan, for example), a package on a cargo rack on the roof of the vehicle 105 (when the vehicle 105 is a sedan, for example), or a person seated in the cabin of the vehicle 105. Some example items that may be placed in the vehicle 105 (trunk, cargo bed and/or the roof of the vehicle 105) can include a tool, a machine component, a ladder, a set of golf clubs, garments, groceries, a backpack, a power generator, a pump, a dehumidifier, and an air compressor.

Some examples of the second object that is a part of the vehicle 105 can be a fixture such as, for example, a child safety seat, a spare tire, a body part of the vehicle 105, or a part of a chassis of the vehicle. The body part of the vehicle 105 can include items such as a door or a removable roof of the vehicle 105.

The processor 126 may evaluate images to detect removal of an object from the vehicle 105. Upon detecting a removal of an object, the processor 126 may reassess the second laden weight of the vehicle 105 and determine of the second laden weight is below the threshold weight limit. If the second laden weight is still above the threshold weight limit, the processor 126 may provide additional guidance (via the projected images) on how to reduce the second laden weight below the threshold weight limit. The guidance procedure can be repeated until the second laden weight falls below the threshold weight limit at which time, the processor 126 may provide an indication that the vehicle 105 has a satisfactory laden weight and is in a satisfactory condition for use.

Figure 2:
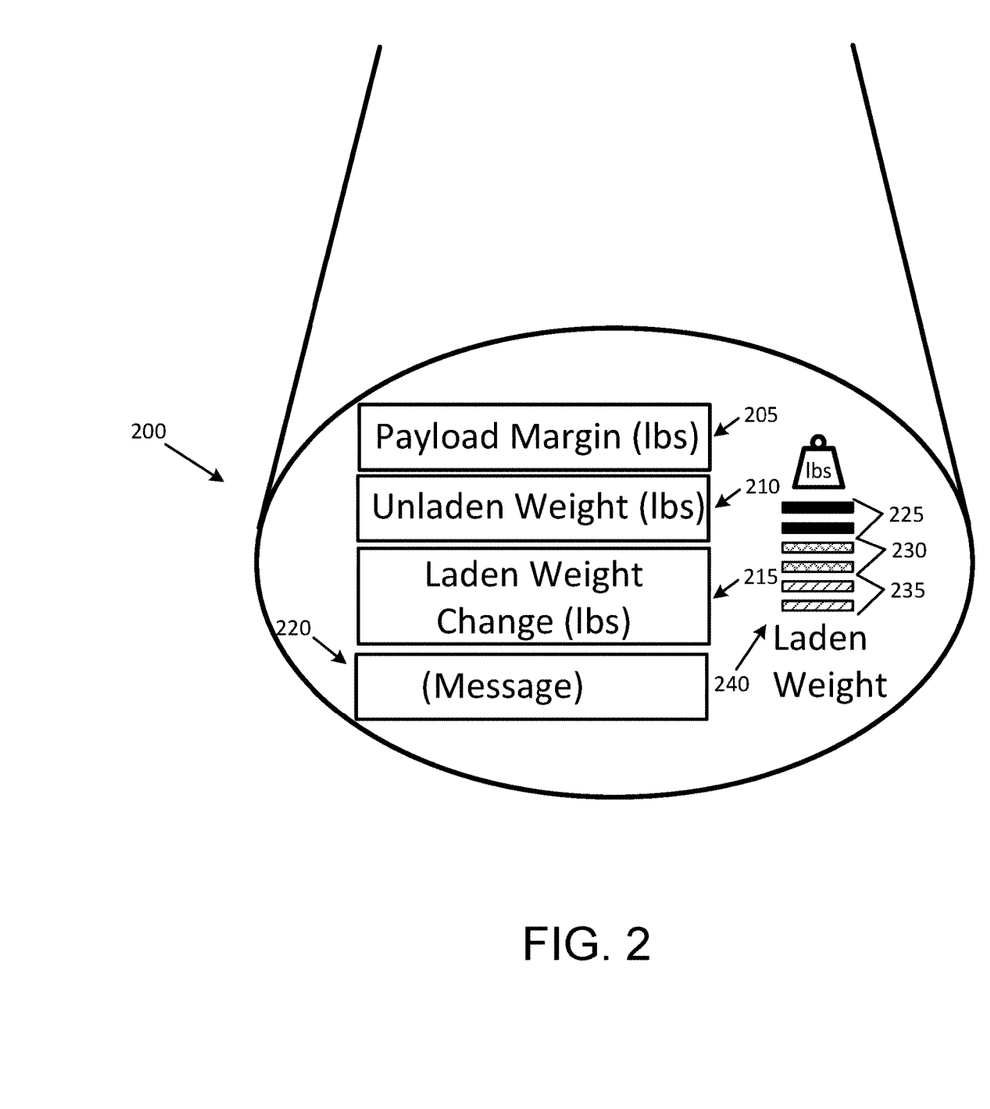
FIG. 2 shows an example image that may be displayed by the vehicle payload display system in accordance with an embodiment of the disclosure.

FIG. 2 shows an example image 200 that may be displayed by the vehicle payload display system 125 in accordance with an embodiment of the disclosure. The image 200 may be produced by any of various image projection devices such as, for example, the image projector 130, the image projector 140, the image projector 170, and the HUD system 155 described above.

The image 200 can include various icons or labels such as, for example, a payload margin 205, an unladen weight 210, a laden weight change 215, a message 220 and a graphical display 240. In this example, the graphical display 240 is provided in the form of a multi-colored light-emitting diode (LED) bar graph having a first section 235 of green LEDs, a second section 230 of yellow LEDs, and a third section 225 of red LEDs.

In an example operation, an individual such as, for example, the driver 145, the forklift operator 114, or the forklift operator 116, may activate the vehicle payload display system 125 (and/or one or more of the image projection devices devices) by activating the switch 109.

The vehicle payload display system 125 may respond to the activation of the switch 109 by displaying the image 200. In an example implementation, the image 200 can include some information that does not vary substantially over time and some other information that may vary over time. For example, the unladen weight 210 of the vehicle 105 does not vary substantially over time and may thus be displayed in a static format. Information pertaining to the unladen weight 210 may be obtained by the vehicle payload display system 125 from various sources such as, for example, from a database of the vehicle payload display system 125, from a database of a computer located outside the vehicle 105, or from cloud storage.

The payload margin 205 may vary over time based on objects being placed on the vehicle 105 or removed from the vehicle 105 from time to time. Consequently, information pertaining to the payload margin 205 that may be included in the image 200 is dynamically modified by the vehicle payload display system 125 based on weight information received from the weight sensor 160 at various times.

In an example implementation, the vehicle payload display system 125 may determine the payload margin 205 in real time by determining a weight difference between a laden weight of the vehicle 105 at any particular instant in time and a payload capacity of the vehicle 105. The image 200 containing the payload margin 205 information is viewable by the forklift operator 114. In at least some situations, the forklift operator 114 may perform various actions based on viewing the payload margin 205 and/or based on reading the message 220.

The vehicle payload display system 125 may update the message 220 in real time to convey various types of load information. A first example message may recommend removal of an object from the vehicle 105 because the laden weight of the vehicle 105 exceeds the payload margin 205. In this situation, one or more of the red LEDs of the graphical display 240 may be illuminated. The vehicle payload display system 125 may also emit an audible warning through the beeper 113.

The vehicle payload display system 125 may subsequently modify the displayed message if one or more objects are removed from the vehicle 105 and the laden weight of the vehicle 105 drops below the payload margin 205. The extent of the drop may be indicated by the illumination status of the green and yellow LEDs. The red LEDs will no longer be illuminated.

In an example operation, the vehicle payload display system 125 may determine a difference between a first laden weight of the vehicle 105 at a first instant in time and a second laden weight of the vehicle 105 at a second instant in time when an object is placed upon the vehicle 105. The difference in weight, which is displayed in the form of the laden weight change 215, may be used for a variety of applications. An example application involves determining a weight of an object. The object can be, for example, a suitcase that is being used by a traveler who desires to know the weight of the suitcase prior to boarding a flight. In this case, the vehicle payload display system 125 may determine a difference between a laden weight of the vehicle 105 prior to the placement of the suitcase on the vehicle 105 and a laden weight of the vehicle 105 after placement of the suitcase on the vehicle 105. The laden weight change 215 indicates the weight of the suitcase.

Figure 3:
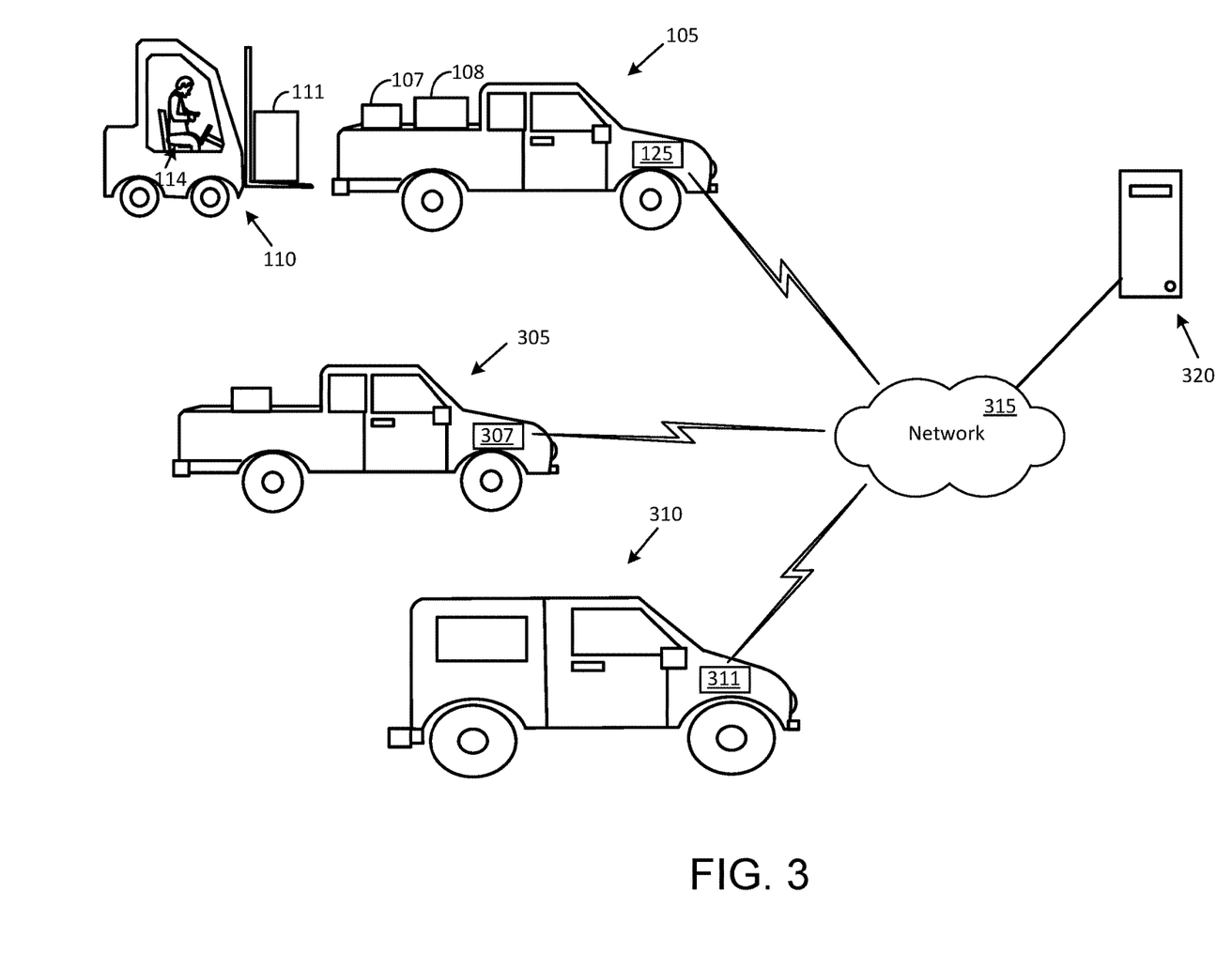
FIG. 3 illustrates an example scenario where a payload distribution operation is executed upon a fleet of vehicles in accordance with the disclosure.

FIG. 3 illustrates an example scenario where a payload distribution operation is executed upon a fleet of vehicles in accordance with the disclosure. The fleet of vehicles can include two or more vehicles, each of which is equipped to transport various types of objects. The vehicles can be either similar to each other (such as, for example, a fleet of identical semi-trucks (18-wheelers), a fleet of identical vans (USPS® vehicles, for example), or a fleet of identical trucks (FEDEX® trucks, for example)) or can be different from each other (a fleet of cars, vans, trucks, and combinations thereof).

In the illustrated example scenario, the fleet of vehicles includes the vehicle 105 (a truck), a vehicle 305 (another truck), and a vehicle 310 (a van). The vehicle 105 includes the vehicle payload display system 125 that is described above. The vehicle 305 includes a vehicle payload display system 307 that can be substantially similar to the vehicle payload display system 125 provided in the vehicle 105. The vehicle 310 also includes a vehicle payload display system 311 that can be substantially similar to the vehicle payload display system 125 provided in the vehicle 105.

The vehicle payload display system 125, the vehicle payload display system 307, and the vehicle payload display system 311 are communicatively coupled to a computer 320, and to each other, via a network 315. The computer 320 can be any of various types of computers such as, for example, a client computer, a server computer, or a cloud computer.

The network 315 can include any one or a combination of a local area network (LAN), a telephone network, a cellular network, a cable network, a wireless network, and/or private/public networks such as the Internet. In some instances, the network 315 may support various wired, wireless, and optical technologies, including Bluetooth, cellular, near-field communication (NFC), Wi-Fi, and/or Wi-Fi direct.

An example payload distribution operation in accordance with the disclosure may involve the forklift operator 114 placing the package 111 in the cargo bed of the vehicle 105, which already contains the package 107 and the package 108. Placement of the package 111 upon the cargo bed of the vehicle 105 causes the laden weight of the vehicle 105 to change. The change in laden weight is detected by the vehicle payload display system 125 and may be displayed via a projected image such as, for example, the image 200 described above. Information about the change in laden weight may also be conveyed by the vehicle payload display system 125 to the computer 320. The computer 320 may evaluate the information provided by the vehicle payload display system 125 and execute some operations in accordance with the disclosure.

In a first example scenario, the computer 320 determines that the laden weight of the vehicle 105 after placement of the package 111 exceeds a reference threshold weight. The reference threshold weight may be a rated payload capacity of the vehicle 105, a prorated payload capacity of the vehicle 105, a customer-designated payload capacity, or any other payload parameter that may be applicable to the vehicle 105.

The prorated payload capacity of the vehicle 105 may be based on the condition of the vehicle 105 (mileage on engine, mileage on tires, wear-and-tear on tires, mechanical condition, etc.).

A customer such as a fleet owner or operator may designate a payload capacity that is less than or equal to the rated payload capacity of the vehicle, and may base this capacity on various factors (repair costs, maintenance costs, etc.). In an example scenario, the customer-designated payload capacity may be 90% of the rated payload capacity of the vehicle 105.

Upon detecting that the laden weight of the vehicle 105 exceeds the reference threshold weight, the computer 320 may communicate with the vehicle payload display system 125 of the vehicle 105 to provide a recommendation to address the overweight issue. The vehicle payload display system 125 may display a message via the image 200 described above to advice the forklift operator 114 to remove the package 111 from the vehicle 105 and place the package 111 in the vehicle 305.

The vehicle payload display system 307 of the vehicle 305 may convey laden weight information to the computer 320 prior to, and after, placement of the package 111 on the vehicle 305. The computer 320 may evaluate the information provided by the vehicle payload display system 307 and communicate with the vehicle payload display system 307 for performing actions such as the ones described above (removing the package 111 from the vehicle 305 and placing the package 111 in the vehicle 310, for example). Similar operations may then take place between the vehicle payload display system 311 of the vehicle 310 and the computer 320.

The payload distribution operation described above with reference to the package 111 may be executed for various reasons such as, for example, to place packages in multiple vehicles based on the payload capacity of each vehicle. In some cases, the computer 320 may execute the payload distribution operation to distribute loads between multiple vehicles of the fleet even if, after placement of a package in a vehicle, the laden weight of the vehicle is less than a payload capacity of the vehicle or less than a reference threshold weight.

Thus, for example, the laden weight of the vehicle 105 after placement of the package 111 on the vehicle 105 may be lower than the reference threshold weight. However, the computer 320 may communicate with the vehicle payload display system 125 to instruct the forklift operator 114 to move the package 111 to the vehicle 310, for example, based on various factors such as the payload capacity of the vehicle 310 being greater than the payload capacity of the vehicle 105, a mechanical condition of the vehicle 310 being better than a mechanical condition of the vehicle 105, and/or weather conditions on a travel route of the vehicle 105 being bad in comparison to weather conditions on a travel route of the vehicle 310.

In some scenarios, at least some of the operations performed by the computer 320 may be performed by individuals such as, for example, the forklift operator 114. In one scenario, for example, the forklift operator 114 may be aware of the weight of the package 111 prior to loading the package on to any of the vehicles of the fleet. The forklift operator 114 may utilize his knowledge of the package 111 and/or information provided by one or more images (payload margin, graphical display 240, etc.) of a vehicle, to load the package 111 on to a particular one of the multiple vehicles of the fleet.

For example, the forklift operator 114 may refrain from loading the package 111 on to the vehicle 105 and instead load the package 111 on to the vehicle 305 based on his/her knowledge of the package 111 and/or information provided by a first image provided by, for example, the image projector 170 and/or the HUD system 155 of the vehicle 115 and/or further based on information provided by a second image projected by an image projector or HUD system of the vehicle 305.

Figure 4:
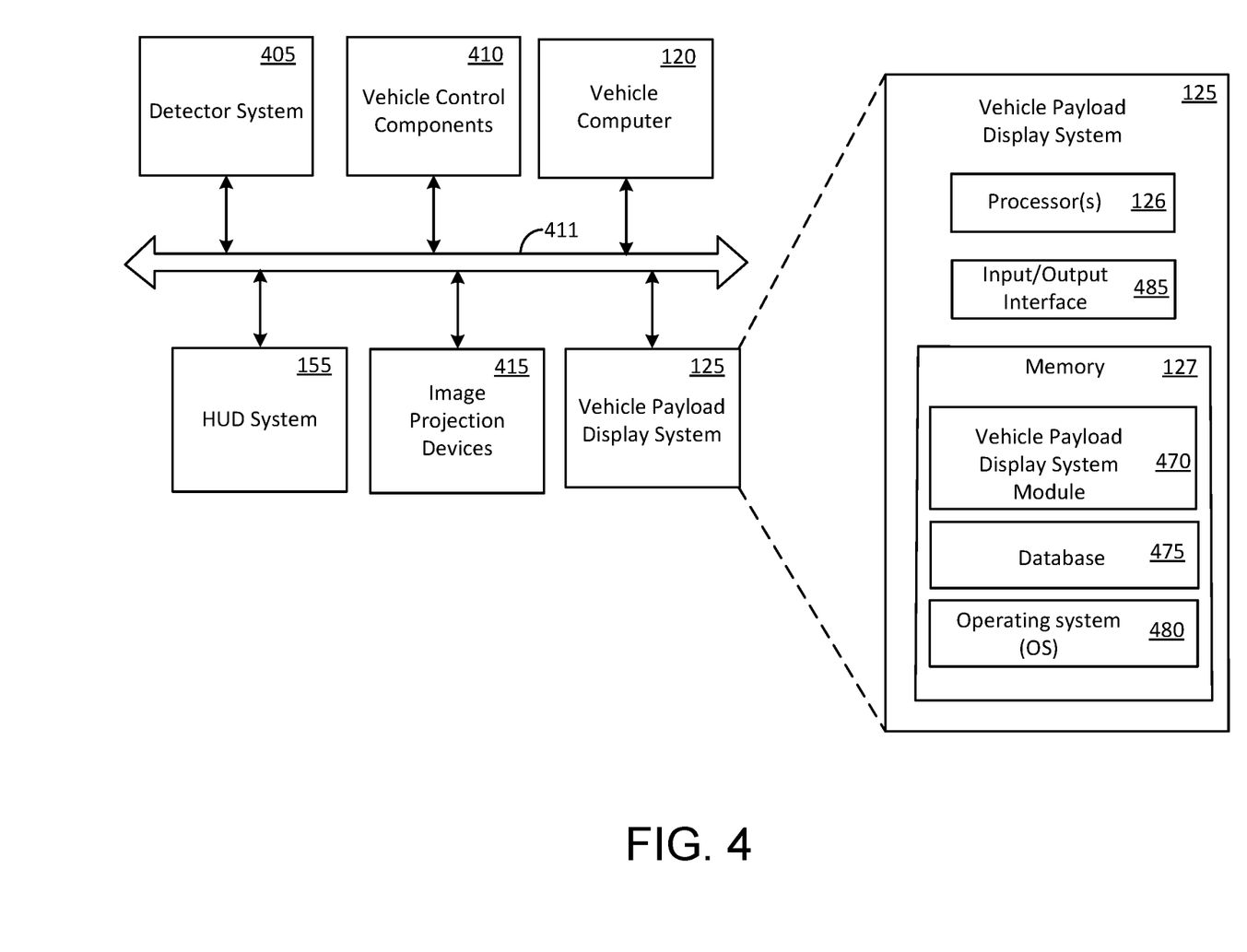
FIG. 4 shows some example components that can be included in a vehicle in accordance with an embodiment of the disclosure.

FIG. 4 shows some example components that can be included in the vehicle 105 in accordance with an embodiment of the disclosure. The example components can include a detector system 405, vehicle control components 410, the vehicle computer 120, the HUD system 155, image projection devices 415, and the vehicle payload display system 125. The various components are communicatively coupled to each other via one or more buses such as an example bus 411. The bus 411 may be implemented using various wired and/or wireless technologies. For example, the bus 411 can be a vehicle bus that uses a controller area network (CAN) bus protocol, a Media Oriented Systems Transport (MOST) bus protocol, and/or a CAN flexible data (CAN-FD) bus protocol. Some or all portions of the bus 411 may also be implemented using wireless technologies such as Bluetooth®, Bluetooth®, Ultra-Wideband, Wi-Fi, Zigbee®, or near-field-communications (NFC).

The detector system 405 can include various types of detectors such as, for example, the weight sensor 160, the camera 106, and the object detector 112 that are shown in FIG. 1. The signals conveyed by the various detectors of the detector system 405 to the vehicle payload display system 125 can vary in accordance with the type of detector. For example, the weight sensor 160 can provide weight information of an object in pounds or kilograms, for example, the camera 106 can provide an image of the forklift operator 114 (for example) in one of various formats (jpeg, mpeg, etc.), and the object detector 112 can provide a digital signal indicating a presence an object, an absence an object, and/or a movement of an object.

The vehicle control components 410 can include various components and systems associated with driving-related functions of the vehicle 105 as well as with functions that are associated with the vehicle payload display system 125.

Some example driving-related functions can include the operation of various vehicle components (engine, brakes, accelerator, fuel injection, etc.), and actions such as collision avoidance, automatic braking, and cruise control. The vehicle control components 410 may be controlled, activated, and/or operated by the vehicle computer 120. In some cases, some of the vehicle control components 410 may be controlled, activated, and/or operated by the vehicle payload display system 125. For example, the vehicle payload display system 125 may utilize some of the vehicle control components 410 to operate various devices among the image projection devices 415.

Description pertaining to the vehicle computer 120, the HUD system 155, and image projection devices 415 such as the image projector 130, the image projector 140, the image projector 170, and the HUD system 155, is provided above.

The vehicle payload display system 125 can be implemented in various ways. In one example implementation, the vehicle payload display system 125 can be an independent device (enclosed in an enclosure, for example). In another example implementation, some or all components of the vehicle payload display system 125 can be housed, merged, or can share functionality, with the vehicle computer 120. For example, an integrated unit that combines the functionality of the vehicle payload display system 125 with that of the vehicle computer 120 can be operated by a single processor and a single memory device. In the illustrated example configuration, the vehicle payload display system 125 includes the processor 126, an input/output interface 485, and a memory 127.

The input/output interface 485 is configured to provide communications between the vehicle payload display system 125 and other components such as the detector system 405 (for receiving images from the cameras and/or weight information from the weight sensor 160, for example) and the image projection devices 415 (for projecting images via components such as, for example, the image projector 130, the image projector 140, the image projector 170, and/or the HUD system 155).

The memory 127, which is one example of a non-transitory computer-readable medium, may be used to store an operating system (OS) 480, a database 475, and various code modules such as a vehicle payload display system module 470. The code modules are provided in the form of computer-executable instructions that can be executed by the processor 126 for performing various operations in accordance with the disclosure.

The vehicle payload display system module 470 may be executed by the processor 126 for performing various operations in accordance with the disclosure. Some example operations are described above.

The database 475 may be used to store information such as, for example, weight information related to the vehicle 105, an inventory of objects located in the vehicle 105, an inventory of objects that may be brought into the vehicle 105, and information pertaining to the vehicle 105 (payload capacity, unladen weight, laden weight, etc.), that can be accessed and used by the processor 126 when executing the vehicle payload display system module 470. In one case, information stored in any of the database 475 pertaining to the payload capacity of the vehicle 105, may be originated by any of various sources, such as, for example, a manufacturer of the vehicle 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    obtaining, by a first processor, information about a first laden weight of a first vehicle;
    determining, by the first processor, a first weight difference between the first laden weight and a first payload capacity of the first vehicle;
    determining, by the first processor, based on the first weight difference, one of a first payload margin available for loading the first vehicle or a first excess weight loaded upon the first vehicle;
    displaying, by the first processor, the one of the first payload margin or the first excess weight, upon a display surface that is viewable from outside the first vehicle;
    receive, by the first processor, one of a second payload margin available for loading a second vehicle or a second excess weight loaded upon the second vehicle;
    receiving, by the first processor, one of a third payload margin available for loading a third vehicle or a third excess weight loaded upon the third vehicle; and
    determining, by the first processor, a load redistribution between the first vehicle, second vehicle and the third vehicle.

2. The method of claim 1, wherein the display surface is at least one of a ground surface outside the first vehicle or a part of the first vehicle.

3. The method of claim 2, wherein the part of the first vehicle is one of a windshield of the first vehicle or a display screen mounted upon the first vehicle, the display screen viewable from outside the first vehicle.

4. The method of claim 3, wherein displaying the one of the first payload margin or the first excess weight on the windshield of the first vehicle comprises projecting a heads-up display on a rear windshield of the first vehicle, the heads-up display configured to be viewable from behind the first vehicle.

5. The method of claim 1, wherein determining the load distribution includes a comparison of the first, second or third payload margins or the first, second and third excess weight loaded.

6. A vehicle comprising:
    a weight sensor;
    at least one of a trunk or a cargo bed; and
    a switch located at the rear of the vehicle, the switch operable to activate at least one of a projector or a heads-up display system for displaying an image upon the at least one of a ground surface outside the vehicle or a windshield of the vehicle;

a memory containing computer-executable instructions; and a processor configured to access the memory and execute the computer-executable instructions to perform operations comprising:

obtaining, from the weight sensor, information about a weight of a payload placed upon the vehicle; and displaying, upon at least one of the ground surface outside the vehicle or the windshield of the vehicle, a presentation of an indication of the weight of the payload placed upon the vehicle.

7. The vehicle of claim 6, further comprising:
a projector located in one of a door of the vehicle or a side view mirror of the vehicle, the projector configured to display the presentation upon the ground surface outside the vehicle.

8. The vehicle of claim 6, further comprising:
a heads-up display system configured to project a heads-up display upon the windshield of the vehicle, the heads-up display configured to be viewable from outside the vehicle.

9. The vehicle of claim 8, wherein the windshield is a rear windshield of the vehicle and wherein the heads-up display is viewable from behind the vehicle.

10. The vehicle of claim 6, wherein the processor is further configured to access the memory and execute the computer-executable instructions to at least:

determine a first weight difference between the weight of the payload placed upon the vehicle and a first payload capacity of the vehicle;

determine, based on the first weight difference, one of a first payload margin available for loading the vehicle or a first excess weight loaded upon the vehicle; and display the one of the first payload margin or the first excess weight upon the ground surface outside the vehicle or the windshield of the vehicle.

11. The vehicle of claim 6, wherein the projector is located in one of a door of the vehicle or a side view mirror of the vehicle and configured to project the image upon the ground surface outside the vehicle.

12. The vehicle of claim 6, wherein the heads-up display system is configured to project a heads-up display of the image upon the windshield of the vehicle, the heads-up display configured to be viewable from outside the vehicle.

* * * * *